United States Patent Office 3,379,773
Patented Apr. 23, 1968

3,379,773
COPOLYMERS OF 1,1,2-TRIFLUORO-
BUTADIENE-1,3
John T. Barr, Neshaminy, Pa., assignor to Pennsalt Chemicals Corporation, a corporation of Pennsylvania
No Drawing. Filed Sept. 28, 1955, Ser. No. 537,291
10 Claims. (Cl. 260—615)

ABSTRACT OF THE DISCLOSURE

Copolymers of 1,1,2-trifluorobutadiene-1,3 and the method of preparing same are described, in particular, with the comonomers hexafluorobutadiene-1,3; 3,4-dichloro-3,4,4-trifluorobutene-1; 2,2,2-trifluoroethyl vinyl ether; vinyl chloride; styrene; 1,1,2-trifluorobutene-1; and 1,1,4,4-tetrafluorobutadiene-1,3.

This invention relates to new polymeric compositions and to processes for the preparation of these new compositions.

At the present time there are a number of fluorine-containing organic polymers available commercially. Each of these possesses useful properties but each one also has one or more serious drawbacks, such as high cost of manufacture, difficulty of preparation, and limited field of application.

It has now been found that 1,1,2-trifluorobutadiene-1,3 can be polymerized with a large number and variety of other monomers to produce copolymers possessing marked advantages over previously known polymeric materials. Polymeric products prepared according to this invention are readily prepared and processed, possess thermal stability over a wide and practical range of temperature, are resistant to solvents and destructive chemical reagents, have good mechanical properties, and in many instances are relatively low in cost.

1,1,2-trifluorobutadiene-1,3 is a relatively new composition of matter and its preparation is described in my copending patent application Ser. No. 421,677, U.S. Patent No. 3,308,175, issued Mar. 7, 1967. Its structure with fluorine atoms at both ends of one of the double bonds, suggested that the compound would not polymerize readily or that only the double bond having no adjacent fluorine atoms would readily enter into polymerization reactions. It is known, for example, that methyl trifluoroethylene, $CF_2=CFCH_3$, and trifluoromethyl ethylene, $CF_3CH=CH_2$, are extremely difficult to polymerize and with known polymerization techniques they polymerize only to a very slight extent.

The ease with which 1,1,2-trifluorobutadiene-1,3 was found to homopolymerize and copolymerize by both 1,4 as well as 1,2 addition was most unexpected and of considerable interest since it made available a new series of fluorine-containing polymers possessing valuable properties.

In practicing the process of this invention 1,1,2-trifluorobutadiene-1,3 is mixed with at least one other polymerizable organic compound having at least one ethylenic double bond and the preferred structure $CXX'=CYY'$, in which X and X' are selected from the group consisting of hydrogen and fluorine; Y is selected from the group consisting of hydrogen, fluorine and alkyl with 1 to 6 carbon atoms; and Y' is selected from the group consisting of hydrogen, chlorine, fluorine, alkyl with 1 to 12 carbon atoms, substituted alkyl with 1 to 12 carbon atoms, carbalkoxy, aryl and substituted aryl; and the mixture subjected to polymerization conditions. Any of the well-known means of polymerization such as mass, solution, or emulsion polymerization may be used to advantage.

In carrying out my invention using mass or solution polymerization the trifluorobutadiene is mixed with the comonomer or comonomers, as the case may be, and with the desired solvent if solution polymerization is being used, and then reacted at ordinary or slightly elevated temperatures. The polymerization will take place without catalyst, although it will proceed much faster when a catalyst is present.

In a preferred embodiment of my invention, using emulsion polymerization techniques, the comonomers are mixed with water, an emulsifying agent and a catalyst and the mixture agitated at ordinary or slightly elevated temperatures.

The degree and rate of polymerization in all cases may advantageously be controlled by varying the amount and nature of catalyst and the temperature.

Comonomers which can be used in carrying out my invention include all polymerizable vinyl and substituted vinyl organic compounds. A few examples which have been found particularly advantageous are: ethylene, vinyl chloride, butadiene, 1,1-difluoroethylene, 2,2,2-trifluoroethyl vinyl ether, 1,1,4,4-tetrafluorobutadiene-1,3, 1,1,2-trifluorobutene-1, methyl acrylate, methyl methacrylate, styrene, 1-chloro-2,2-difluoroethylene, 3,4-dichloro-3,4,4-trifluorobutene-1, and perfluorobutadiene-1,3. It will be understood that this list is presented only by way of illustration and is not to be construed as limiting my invention to copolymers of 1,1,2-trifluorobutadiene-1,3 with the named compounds.

Although the most valuable products of my invention are obtained by the copolymerization of a mixture of 1,1,2-trifluorobutadiene-1,3 and another polymerizable organic compound or compounds as defined above and containing from 5% to 95% of the comonomer and from 95% to 5% of 1,1,2-trifluorobutadiene-1,3, on a weight basis, my invention can also be operated to advantage when the amount of 1,1,2-trifluorobutadiene-1,3 is less than 5% or greater than 95%.

The copolymerization reaction according to my invention may be carried out over a wide range of temperature. For example, when using the preferred technique, emulsion polymerization, the temperature may be varied from below 0° C. to well over 100° C. When using mass or solution polymerization techniques, the temperature range can be even broader, for example, from −15° to well over 150° C. Generally, however, it is preferred to carry out emulsion polymerizations in the temperature range of from 5° to 75° C., and mass and solution polymerizations in the temperature range of from 10° to 80° C.

A number of materials are known to the art as polymerization catalysts or initiators and many of these may be used in operating my invention. A few examples of such materials are oxygen, ozone, hydrogen peroxide, benzoyl peroxide, cumene hydroperoxide and other organic peroxides, organic ozonides, 2-azobisisobutyronitrile and similar agents, percarbonates, perborates, persulfates, and perchlorates. Although most of these catalysts may be used for mass, solution or emulsion polymerization, it is generally accepted that best results are obtained when water soluble catalysts are used for emulsion polymerization, and oil or organic soluble catalysts are used for mass and solution polymerization.

Catalysts whcih have been found to be especially useful for mass and solution polymerization in my invention are benzoyl peroxide and 2-azobisisobutyronitrile. Catalysts which have been found to be especially useful for emulsion polymerization are the persulfates of ammonium, sodium and potassium. The speed of the polymerization reaction is partially dependent on the amount as well as the type of catalyst used, and in operating the process of my invention it has been found that the amount of catalyst may be varied from as little as 0.01% to as much as 4% of the combined monomer weights, although the preferred amount is from 0.1% to 2.5%.

In carrying out my process by means of emulsion polymerization the amount of water required is not critical but for practical purposes it is preferred to use an amount of from 1 to 4 times the combined weights of the monomers.

A number of suitable emulsifying agents are known to the art and almost any of these may be used in my process. A few examples of emulsifying agents which have been used successfully in carrying out the process of my invention are Triton X-100, an alkyl aryl polyether alcohol; Triton X-200, the sodium salt of an alkyl aryl polyether sulfonate; Dupanol ME, the active ingredient of which is sodium lauryl sulfate; perfluorocaprylic acid, ammonium perfluorocaprylate, and various fatty acid soaps. The amount of emulsifying agent may be varied from about 0.1% to about 15% of the combined weights of the monomers, although the preferred amount is from 1% to 10%.

Auxiliary polymerization agents known to the art, although not essential to the operation of my invention, may be used to advantage in copolymerizing 1,1,2-trifluorobutadiene-1,3 with other comonomers when employing an emulsion polymerization technique. For example, a small amount of sodium bisulfate added initially helps to activate the catalyst and thus promotes the start of the reaction. A small amount of buffer, such as borax, is helpful in preventing changes in pH caused by slight hydrolysis of the reactants. The addition of a small amount of a mercaptan, such as tertiary dodecyl mercaptan, is effective in regulating molecular weight of the polymer and preventing the formation of products with excessively high molecular weights.

It is clear to those skilled in the art that since the amount of catalyst and the polymerization temperature affect the reaction rate they also affect the reaction time. With this understood it becomes apparent that the reaction time can be varied over a wide range, depending upon the particular conditions used and the degree of polymerization desired. In general a reaction time of from 5 to 60 hours has been found to be suitable and practical although good results may also be obtained using less than 5 hours or longer than 60 hours.

Although the object of my invention is to make available copolymers of 1,1,2-trifluorobutadiene-1,3 and processes for preparing these copolymers, it is to be understood also that in some instances the products of my invention may contain homopolymers of each of the comonomers in addition to the described copolymers. This is particularly true when a comonomer is present in a fairly large proportion.

Polymeric products of my invention which have the most valuable properties are rubbery solids although valuable products ranging from viscous liquids to hard solids at ordinary temperatures may also be prepared, depending on the application desired, by varying the comonomer or comonomers used, the proportions of comonomers, and the conditions and degree of polymerization.

Rubbers obtained by curing copolymers prepared according to this invention have superior mechanical properties as compared to other highly fluorinated rubbers or rubbery polymers. They also have outstanding resistance to solvents, oils, oxygen, sunlight, heat, aging, acids, alkalies, and other chemicals, and are particularly useful where resistance to these is necessary, as, for example, in the chemical process and allied industries. Examples of especially valuable applications include gaskets, packings, flexible piping, hose, linings, coatings, chemically resistant gloves and boots, etc. The stability of liquid products obtained by means of this invention makes them useful as heat transfer media and high temperature lubricants.

From the foregoing disclosure it is clear that the new polymeric products and rubbers of this invention possess important characteristics and utility not possessed by polymers heretofore available and can be used to advantage in a large number of commercial products.

The invention and its practice are further illustrated by the following examples, in which the parts are by weight.

Example 1

A pressure reactor was charged with 50 parts of 1,1,2-trifluorobutadiene-1,3 and 50 parts of hexafluorobutadiene-1,3, and the mixture allowed to stand at room temperature for three days. On evaporating off the unreacted monomers a very elastic, rubbery solid, quite different from the homopolymer of either 1,1,2-trifluorobutadiene-1,3 or hexafluorobutadiene-1,3 was obtained.

Example 2

A pressure reactor was charged with 50 parts of 1,1,2-trifluorobutadiene-1,3, 50 parts of 3,4-dichloro-3,4,4-trifluorobutene-1, and 0.5 part of benzoyl peroxide and the mixture reacted at 70° C. for 40 hours. 26.8 parts of a very rubbery solid were obtained.

Example 3

A pressure reactor was charged with 50 parts of 1,1,2-trifluorobutadiene-1,3, 50 parts of hexafluorobutadiene-1,3, and 0.5 part of 2-azobisisobutyronitrile, and the mixture reacted at 70° C. for 24 hours. 35 parts of a mixture of soft, rubbery solid and clear viscous liquid polymers were obtained.

Example 4

A pressure reactor was charged with 50 parts of 1,1,2-trifluorobutadiene-1,3, 50 parts of 2,2,2-trifluoroethyl vinyl ether, and 0.5 part of 2-azobisisobutyronitrile, and the mixture reacted at 70° C. for 24 hours. 55 parts of a clear, viscous liquid polymer were obtained.

Example 5

A pressure reactor was charged with 50 parts of 1,1,2-trifluorobutadiene-1,3, 50 parts of hexafluorobutadiene-1,3, 14 parts of water, 4.6 parts of the ammonium salt of perfluorocaprylic acid, 0.90 part of potassium persulfate, 0.40 part sodium bisulfite, 0.40 part borax, and 0.80 part tertiary dodecyl mercaptan, and agitated at 50° C. for 40 hours. 46 parts of soft, crumbly solid polymer which did not become tacky on heating to 200° C. were obtained.

Example 6

A pressure reactor was charged with 50 parts of 1,1,2-trifluorobutadiene-1,3, 50 parts of 3,4-dichloro-3,4,4-trifluorobutene-1, 144 parts of water, 4.6 parts of the ammonium salt of perfluorocaprylic acid, 0.90 part of potassium persulfate, 0.40 part of sodium bisulfite, 0.40 part of borax, and 0.80 part of tertiary dodecyl mercaptan, and agitated at 50° C. for 40 hours. 53 parts of a soft, rubbery polymer were obtained.

Example 7

A pressure reactor was charged with 5 parts of 1,1,2-trifluorobutadiene-1,3, 95 parts of vinyl chloride, 150 parts of water, 3.0 parts of Triton X-200, and 0.5 part of potassium persulfate, and agitated at 50° C. for 40 hours. 77.3 parts of a friable, white polymer were obtained.

Example 8

A pressure reactor was charged with 6 parts of 1,1,2-trifluorobutadiene-1,3, 94 parts of methyl acrylate, 150 parts of water, 3.0 parts of Triton X-200, and 0.5 part of potassium persulfate, and agitated at 50° C. for 17 hours. 96 parts of a brittle, crumbly polymer were obtained.

30 parts of this polymer were cured at 144° C. and 500 pounds per square inch pressure with 12 parts of Philblack A (carbon black), 0.3 part of zinc oxide, 0.12 part of sulfur, and 0.105 part of Altax (benzothiazyl disulfide). The resultant rubber had a tensile strength of 2380 pounds per square inch and 425% elongation at its break point.

Example 9

A pressure reactor was charged with 50 parts of 1,1,2-trifluorobutadiene-1,3, 50 parts of methyl acrylate, 150 parts of water, 3.0 parts of Triton X–200, and 0.5 part of potassium persulfate, and agitated at 50° C. for 17 hours. 91.3 parts of a tough, solid polymer were obtained.

30 parts of this polymer were cured at 144° C. and 500 pounds per square inch pressure with 12 parts of Philblack A, 0.75 part of zinc oxide, 0.30 part of sulfur, and 0.26 part of Altax. The resultant rubber had a tensile strength of 2080 pounds per square inch and 485% elongation at its break point. On aging for 7 days at 70° C. it showed an increase in stiffness of only 20% as against 100% for GR–S standard rubber. It softened only slightly at 200° C. and swelled slightly in hydrocarbon solvents.

Example 10

A pressure reactor was charged with 50 parts of 1,1,2-trifluorobutadiene-1,3, 50 parts of methyl methacrylate, 150 parts of water, 3.0 parts of Triton X–200, and 0.5 part of potassium persulfate, and agitated at 50° C. for 17 hours. 93.3 parts of a hard, rubbery polymer were obtained. This polymer had a tensile strength of 3000 pounds per square inch and 325% elongation at its break point without having been cured.

Example 11

A pressure reactor was charged with 50 parts of 1,1,2-trifluorobutadiene-1,3, 50 parts of 1,1,2-trifluorobutene-1, 180 parts of water, 3.0 parts of Duponol ME, 1.13 parts of potassium persulfate, 0.5 part of sodium bisulfate, 0.5 part of borax, and 0.2 parts of tertiary dodecyl mercaptan, and agitated at 50° C. for 40 hours. 41.5 parts of a spongy, white polymer were obtained.

Example 12

A pressure reactor was charged with 75 parts of 1,1,2-trifluorobutadiene-1,3 25 parts of 1,1,4,4-tetrafluorobutadiene-1,3, 180 parts of water, 3.0 parts of Duponol ME, 1.13 parts of potassium persulfate, 0.5 part of sodium bisulfite, 0.5 part of borax, and 0.2 part of tertiary dodecyl mercaptan, and agitated at 50° C. for 48 hours. 72.0 parts of a white, fluffy, solid polymer were obtained.

Example 13

A pressure reactor was charged with 46.3 parts of 1,1,2-trifluorobutadiene-1,3 53.7 parts of 2,2,2-trifluoroethyl vinyl ether, 180 parts of water, 3.0 parts of Duponol ME, 1.13 parts of potassium persulfate, 0.5 part of sodium bisulfite, 0.5 part of borax, and 0.2 part of tertiary dodecyl mercaptan, and agitated at 50° C. for 48 hours. 55 parts of a tough, sticky, solid polymer were obtained.

A sample of cured rubber prepared from this polymer was not affected by nitric acid and hydrocarbon solvents, and showed only slight swelling on treatment with oxygenated solvents such as methyl ethyl ketone.

Example 14

A pressure reactor was charged with 80 parts of 1,1,2-trifluorobutadiene-1,3, 20 parts of styrene, 180 parts of water, 3.0 parts of Duponol ME, 1.13 parts of potassium persulfate, 0.5 part of sodium bisulfite, 0.5 part of borax, and 0.2 part of tertiary dodecyl mercaptan, and agitated at 50° C. for 48 hours. 97.5 parts of a tough, rubbery, solid product were obtained.

Example 15

A pressure reactor was charged with 20 parts of 1,1,2-trifluorobutadiene-1,3, 80 parts of styrene, 180 parts of water, 3.0 parts of Duponol ME, 1.13 parts of potassium persulfate, 0.5 part of sodium bisulfite, 0.5 part of borax, and 0.2 part of tertiary dodecyl mercaptan, and agitated at 50° C. for 18 hours. 96.5 parts of a white, crystalline polymer were obtained.

Example 16

A pressure reactor was charged with 83.4 parts of 1,1,2-trifluorobutadiene-1,3, 16.6 parts of 1,1-difluoroethylene, 335 parts of water, 11.2 parts of ammonium perfluorocaprylate, 1.86 parts of potassium persulfate, 0.93 part of sodium bisulfite, and 0.93 part of borax, and agitated at 50° C. for 48 hours. 46.6 parts of a tan, rubbery, solid polymer were obtained.

Example 17

A pressure reactor was charged with 57 parts of 1,1,2-trifluorobutadiene-1,3, 43 parts of ethylene, 335 parts of water, 11.2 parts of ammonium perfluorocaprylate, 1.86 parts of potassium persulfate, 0.93 part of sodium bisulfite, and 0.93 part of borax, and agitated at 50° C. for 40 hours. 41 parts of a soft, white, crumbly polymer were obtained.

Many widely different embodiments of this invention may be made without departing from the scope and spirit of it and it is to be understood that my invention includes all such embodiments and is not to be limited by the above description.

I claim:

1. A copolymer formed from 5 to 95% by weight of 1,1,2-trifluorobutadiene-1,3 and 95 to 5% of hexafluorobutadiene-1,3.
2. A copolymer formed from 5 to 95% by weight of 1,1,2-trifluorobutadiene-1,3 and 95 to 5% of 3,4-dichloro-3,4,4-trifluorobutene-1.
3. A copolymer formed from 5 to 95% by weight of 1,1,2-trifluorobutadiene-1,3 and 95 to 5% of 2,2,2-trifluoroethyl vinyl ether.
4. A copolymer formed from 5 to 95% of 1,1,2-trifluorobutadiene-1,3 and 95 to 5% of vinyl chloride.
5. A copolymer of 1,1,2-trifluorobutadiene-1,3 and styrene.
6. A copolymer formed from 5 to 95% by weight of 1,1,2-trifluorobutadiene-1,3 and 95 to 5% by weight of 1,1,2-trifluorobutene-1.
7. A copolymer formed from 5 to 95% by weight of 1,1,2-trifluorobutadiene-1,3 and 95 to 5% by weight of 1,1,4,4-tetrafluorobutadiene-1,3.
8. A process for preparing a new polymeric product which comprises polymerizing a mixture of 1,1,2-trifluorobutadiene-1,3 and at least one other organic compound selected from the group consisting of hexafluorobutadiene-1,3; 3,4-dichloro-3,4,4-trifluorobutene-1; 2,2,2-trifluoroethyl vinyl ether; vinyl chloride; styrene; 1,1,2-trifluorobutene-1; and 1,1,4,4-tetrafluorobutadiene-1,3.
9. The process of claim 8 in which the polymerization is effected by heating the mixture of monomers, containing from 5 to 95% by weight of 1,1,2-trifluorobutadiene-1,3, in contact with from about 0.01 to 4% of a free-radical polymerization initiator in the temperature range from about −15° to 150° C.
10. The process of claim 8 carried out in contact with about 1 to 4 parts by weight of water and about 0.1 to 15% by weight of emulsifying agent, said weights being based on the combined weights of the monomers.

References Cited

UNITED STATES PATENTS

| | | | |
|---|---|---|---|
| 2,647,110 | 7/1953 | Wiseman | 260—92.1 XR |
| 2,668,182 | 2/1954 | Miller. | |
| 2,917,496 | 12/1959 | Honn | 260—86.3 |
| 2,917,498 | 12/1959 | Honn | 260—92.1 |
| 2,949,446 | 8/1960 | Honn | 260—87.5 |

JAMES A. SEIDLECK, *Primary Examiner.*

M. STERMAN, J. R. LIBERMAN, A. M. BOETTCHER,
*Examiners.*

J. F. McNALLY, D. HOES, LA PRADE, L. ZITVER,
*Assistant Examiners.*